United States Patent Office 2,701,118
Patented Feb. 1, 1955

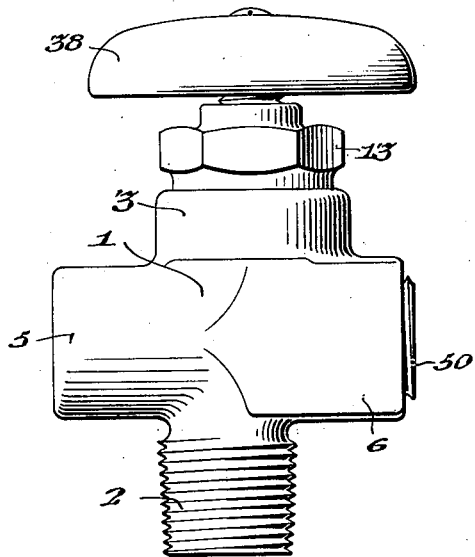
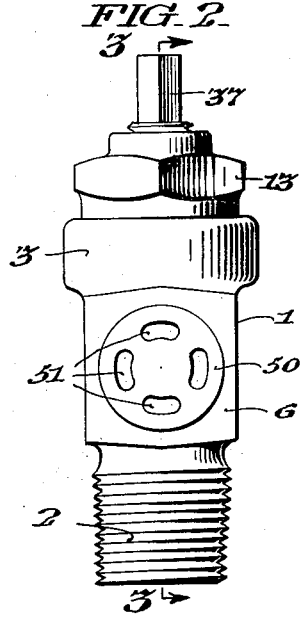
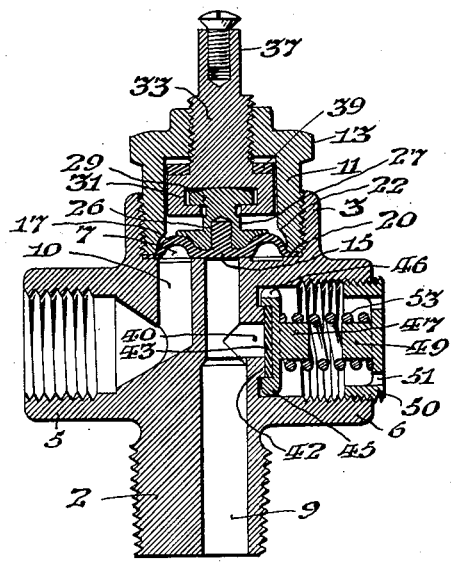
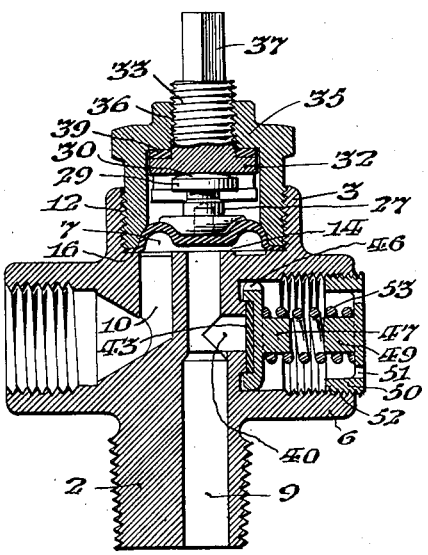
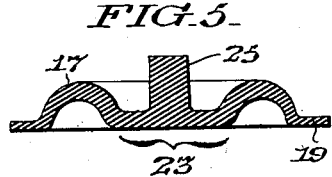

2,701,118

HIGH-PRESSURE VALVE

Wilmer P. Uhler, Tottenville, N. Y., assignor to The S. S. White Dental Manufacturing Company, a corporation of Pennsylvania Application September 3, 1949, Serial No. 114,001

2 Claims. (Cl. 251—264)

My invention relates particularly to that class of valves that are commonly known as diaphragm valves and sometimes designated as packless valves, and is especially directed to an assembly whereby the control is effected by diaphragm actuation.

It has been found that valves of this general class have been deemed to be unsatisfactory owing to failure, due to the design or construction of their operative parts, to positively control the escape of gas such as propane, butane, acetylene, ethylene oxide and other gases that are generally stored therein at relatively high pressures, and wherein their accidental escape might prove highly detrimental or even be dangerous.

The principal objects of my invention are to provide a pressure valve that will easily and efficiently operate to control the flow of gases or fluids under pressure from the storage container to the place of use without possible leakage or escape and by the easy control of a minimum complement of operative parts.

Other objects of my invention are to provide a pressure valve embodying these controlling features cooperative with novel safety discharge means operable at predetermined pressures to relieve undue excessive pressures that might accidentally accumulate within the storage container.

My invention further contemplates the employment of a flexible diaphragm that decreases in thickness from its central region to its peripheral edge and which includes an annular embossed ridge affording flexibility in its movement with respect to the valve seat with which it cooperates, while its peripheral margin is held seal tight.

My invention includes the employment of a diaphragm composed of a tough, pliant and resilient material such as polymide resin that will withstand the fatigue strains incident to the constant bending forward and back necessary to its alternate engagement and disengagement with its cooperative valve seat.

The form of my invention as hereinafter described, comprehends a valve having a chamber connected with inlet and outlet passageways that are arranged to be controlled by a unitary resilient circularly corrugated diaphragm having its peripheral margin rigidly engaged in leak proof relation with a seat in said chamber by a valve cap threadedly engaged with the chamber walls and itself carrying a valve stem threadedly engaged therewith and yieldingly connected with the central region of said diaphragm to raise and lower it with respect to a seat encircling said inlet passageway.

My invention also includes all of the various novel features of construction and arrangement as hereinafter more definitely specified.

In the accompanying drawings, Figure 1 is a front elevational view of a valve constructed in accordance with my invention; Fig. 2 is an end elevational view of said valve as viewed from the right of Fig. 1; Fig. 3 is a central vertical sectional view of said valve, taken on the line 3—3 in Fig. 2, looking in the direction indicated by the arrows and showing the operative parts of the valve in its closed position; Fig. 4 is a central vertical sectional view similar to Fig. 3, showing the valve in its open position, the plane of section of the valve stem being shown transverse to the plane of section of the valve stem as illustrated in Fig. 3; and Fig. 5 is an enlarged central vertical transverse sectional view of the closure diaphragm.

In said figures, the valve body 1 comprises the depending externally screw threaded inlet boss 2, the upwardly extending cylindrical valve housing 3, the laterally extended internally threaded outlet boss 5 and the laterally extended safety valve housing 6.

The valve chamber 7, which connects the inlet passageway 9 entering through the threaded boss 2 with the outlet passageway 10 discharging through the internally threaded boss 5, is disposed within the valve housing 3, and is closed by the hollow valve plug 11 serving as a cap which is screw-threadedly engaged with the internal screw threads 12 in said valve housing 3, and has the hexagonal flange 13 by which it may be adjusted.

The floor of the valve chamber 7 is provided with the slightly raised annular valve seat 14 encircling the mouth of the inlet passageway 9 and upon which seat the imperforate valve diaphragm 15 cooperates to effect closing of the inlet passageway 9, as shown in Fig. 3, and said floor is also provided with the raised annular seat 16 concentric with the valve seat 14 and embracing outside of the mouths of both the inlet passageway 9 and outlet passageway 10.

The valve diaphragm 15 may be composed of any suitable material but is preferably made of polymide resin and is formed with an embossed annular hollow ridge 17 formed by an annular portion which is arched upwardly above the chamber floor for providing maximum flexibility and durability and has its plane peripheral margin 19 engaged in seal tight relation with the seat 16 by the inner edge 20 of the cylindrical threaded wall of the valve plug 11.

Referring to Figs. 3 and 4, the inner corner of the hollow valve plug 11 is formed to provide an annular concave groove 22 providing a pocket for supporting the diaphragm 15 when in its open position and the valve chamber 7 is filled with gas or other fluid under pressure, as shown in Fig. 4, thereby relieving said diaphragm of undue strains incident to such pressure.

As best illustrated in Fig. 5, the valve diaphragm 15 is preferably varied in thickness, diminishing from its maximum thickness at its central plane region 23 that is arranged to engage the valve seat 14 to the peripheral margin 19 which engages the seat 16. Said diaphragm is provided at its center with the upwardly projecting stud 25 which is arranged to engage the socket 26 in the valve stem connecting link 27, as shown in Figs. 3 and 4, and suitably secured therein.

The lower surface of the connecting link 27 is shaped to substantially conform to the contour of the central plane region 23 and the adjacent annular ridge 17 of the diaphragm 15 and serves to cooperate with the annular concave groove 22 in supporting the diaphragm 15 against high pressure when in open position, as shown in Fig. 4.

As shown in Fig. 3 and Fig. 4, the valve stem structure includes the connecting link 27 which terminates upwardly in a flange 29 forming a head having a rounded top surface 30, said head being loosely engaged in the undercut T-shaped transversely extended slot 31 in the terminal flange 32 on the lower end of the valve stem 33, which is in screw threaded engagement with the upper wall 35 of the valve plug 11 by the screw threads 36.

The valve stem 33 is provided with the upwardly extended square post 37 with which the valve controlling knob 38 is engaged by the keeper screw disposed in the threaded socket which depends axially into said square post 37, and by the rotation of said knob 38 the valve stem 33 and its connected valve diaphragm 15 are raised or lowered to respectively open or close the valve inlet passageway 9 as may be desired.

In order to guard against the possibility of accidental fracture of the valve diaphragm 15 whereby loss by leakage of gas would naturally ensue, the annular washer 39 formed of any suitable material, preferably polymide resin, is disposed between the terminal flange 32 and the inner surface of the wall 35 and encircling the valve stem 33, so that when the valve is open, as shown in Fig. 4, said washer 39 will afford a sealed joint against leakage.

To provide against any excess pressures that may accumulate within the container to which the valve may be attached, said valve is provided with safety mechanism enclosed within the safety-valve housing 6 which includes the port 40 connected with the inlet passageway 9 and encircled by the valve seat 42 which is in the form of an annular ridge.

As shown in Fig. 3, the port 40 is normally closed by the valve disk 43 preferably formed of polymide resin which is encased in a cupped disk carrier 45 having a plurality of notches 46 in its periphery for the escape of gas and an outwardly projecting hub 47 opposed to an inwardly projecting hub 49 on the perforated closure plug 50 having discharge perforations 51 and threadedly engaged with the internally disposed screw threads 52 in the bore of the safety-valve housing 6.

The valve disk 43 is pressed against the valve seat 42 by tension of the spring 53 which has one end bearing against the cupped carrier 45 and the opposite end bearing against the plug 50 with said ends respectively embracing said hubs 47 and 49 for support. Obviously, the tension of the spring pressure on the valve disk 43 may be varied by rotation of the closure plug 50.

My invention is advantageous in that should damage to the valve diaphragm 15 occur by reason of disintegration, the gas may be prevented from accidental escape by the washer 39 upon opening rotation of the controlling knob 38 to its full open position of the valve, so that even in event of damage to the valve diaphragm, retention of the gas in the container will be insured until such time as it is to be discharged under normal conditions, for leakage cannot occur except during the momentary opening and closing of the valve.

I do not desire to limit my invention to the precise details of construction and arrangement as herein set forth, as it is obvious that various modifications may be made therein without departing from the essential features of my invention as defined in the appended claims.

Having thus described my invention, I claim:

1. A valve for controlling fluids under pressure comprising a body having a chamber with a floor and inlet and outlet passageways having mouths in the chamber floor, said chamber floor including an annular valve seat encircling the mouth of the inlet passageway and also including an annular seat portion embracing the mouths of both passageways, an imperforate resilient flexible diaphragm having on its lower surface a central plane region for engaging said annular valve seat, said diaphragm having a peripheral margin engaged with said annular seat portion and diminishing in thickness outwardly and having between said central surface and said peripheral margin an annular portion which is arched upwardly above said floor to provide an annular ridge, said diaphragm having an upwardly projecting stud opposite said central surface, a hollow screw plug forming a cap for the valve body and threadedly engaged inside the chamber wall, said plug having an internal cavity and having its inner edge impinging upon the said peripheral margin to form a sealed joint, and a valve stem structure in threaded engagement with said screw plug and at its inner end presenting within said cavity a flange in conforming supporting contact with the diaphragm opposite said central surface and over an adjacent inner part of the ridge, said structure having a part presenting a socket engaging said diaphragm stud, said plug having an annular concave groove conformed to the outer part of the arched ridge portion of the diaphragm and providing a pocket to receive and support the same when the central region of the diaphragm is moved to open position.

2. A valve as in claim 1, which the stem structure includes a stem threadedly engaged with the screw plug and having a second flange opposite the inner surface of the hollow plug; and a resilient washer carried by the stem and interposed between the second flange and the said opposed inner surface of the plug for forming a sealed joint therebetween when the valve is in open position.

References Cited in the file of this patent

UNITED STATES PATENTS

| Number | Name | Date |
|---|---|---|
| 517,550 | Messinger | Apr. 3, 1894 |
| 954,172 | Dalen | Apr. 5, 1910 |
| 1,433,129 | Fransson | Oct. 29, 1922 |
| 2,194,541 | Buttner | Mar. 26, 1940 |
| 2,216,292 | Evleth | Oct. 1, 1940 |
| 2,300,722 | Adams | Nov. 3, 1942 |
| 2,342,347 | Jacobsen | Feb. 22, 1944 |
| 2,354,958 | Loweke | Aug. 1, 1944 |
| 2,394,243 | Joyce | Feb. 5, 1946 |

FOREIGN PATENTS

| Number | Country | Date |
|---|---|---|
| 278,814 | Italy | 1930 |
| 136,226 | Switzerland | 1930 |
| 538,208 | Great Britain | 1940 |